United States Patent [19]
Mathews

[11] Patent Number: 5,626,763
[45] Date of Patent: May 6, 1997

[54] TAPERED BED APPARATUS FOR FLUID-SOLID MASS TRANSFER OPERATIONS

[76] Inventor: Alexander P. Mathews, 2033 Somerset Sq., Manhattan, Kans. 66502

[21] Appl. No.: 540,669

[22] Filed: Oct. 11, 1995

[51] Int. Cl.⁶ .................................................. C02F 1/42
[52] U.S. Cl. .............................. 210/660; 210/290
[58] Field of Search ................................ 210/290, 660

[56] References Cited

U.S. PATENT DOCUMENTS

| | | | |
|---|---|---|---|
| 17,987 | 8/1857 | Thompson | 210/290 |
| 293,745 | 2/1884 | Hyatt | 210/290 |
| 331,790 | 12/1885 | Hood | 210/290 |
| 1,759,013 | 5/1930 | Lancaster | 210/290 |
| 2,101,961 | 12/1937 | Slidell | 210/275 |
| 3,171,802 | 3/1965 | Rice et al. | 210/290 |
| 3,471,025 | 10/1969 | Dobson | 210/282 |
| 4,202,770 | 5/1980 | Gappa et al. | 210/96.1 |
| 4,891,142 | 1/1990 | Hering, Jr. | 210/792 |
| 5,112,504 | 5/1992 | Johnson | 210/792 |
| 5,126,042 | 6/1992 | Malone | 210/150 |
| 5,173,194 | 12/1992 | Hering, Jr. | 210/792 |
| 5,232,586 | 8/1993 | Malone | 210/150 |
| 5,292,436 | 3/1994 | Mathews | 210/290 |

*Primary Examiner*—Cynthia L. Nessler

[57] ABSTRACT

A mass transfer method for transferring a component from gases or liquids into adsorbent granules or ion-exchange resin granules utilizing a mass transfer apparatus that allows for the fluid velocity to decrease from the inlet to the outlet. The apparatus is partially filled with porous granules comprising large and small diameter particles arranged such that the larger diameter granules are located closer to the inlet than the smaller diameter granules.

6 Claims, 5 Drawing Sheets

TAPERED BED APPARATUS FOR FLUID-SOLID MASS TRANSFER OPERATIONS

BACKGROUND OF THE INVENTION

1. Field of the Invention

The field of this invention relates generally to devices and methods for fluid-solid and fluid-fluid mass transfer and in particular to an apparatus and a method for conducting mass transfer operations such as adsorption and ion-exchange using a bed of stratified porous granules in a chamber that has a variable cross-sectional area along the length of the chamber.

2. Description of the Prior Art

Mass transfer operations such as adsorption and ion-exchange involve the transfer of one or more components from a fluid mixture on to a solid granule that is relatively porous in nature. Adsorption and ion-exchange operations are used in chemical processing in bulk separation of chemicals or for purification in water and wastewater treatment to remove trace contaminants, in air pollution control for the removal of gaseous impurities, in medical applications for the purification of fluids, etc. In normal applications, large volumes of fluid are contacted with a small mass of the adsorbent in fixed-beds or fluidized-beds, and as the fluid passes through the bed, material is transferred from the fluid phase to the solid phase. Once the bed is partially or fully loaded, the adsorption step is terminated and the adsorbent is regenerated by a variety of methods. By operating a number of adsorbent beds simultaneously, columns can be cycled on and off from adsorption to regeneration steps, thereby providing continuous operation.

The large volume of fluid processed and the number of cycles imply that pumping energy to move the fluids across the bed is a significant cost factor. In addition, for mass transfer operations, including adsorption and ion-exchange, the process efficiency can be increased by increasing the rate at which mass is transferred from the fluid phase to the solid phase. It is desirable to strike a balance between increased mass transfer rate and low column pressure drop to increase the process efficiency.

In many applications, the fluid to be treated contains particulate matter that will get trapped in the fixed bed. Pressure drop will increase, due to the build up of particulate matter and hence the bed must be backwashed periodically. In some cases such as in the purification of fermentation broths, water and wastewater treatment, etc. microorganism growth may also occur, requiring frequent backwash operations. In conventional fixed beds using a range of adsorbent sizes, the particles will be fluidized during backwash and distribute themselves in such a manner that fine particles are at the top section of the bed, and coarse particles are at the bottom of the bed. If the fluid to be treated contains a large amount of particulate matter, the top section of the bed will clog rapidly while the bottom portion of the bed will be relatively free of particulates. This will increase the column pressure drop and decrease the overall efficiency of the mass transfer operations.

SUMMARY OF THE INVENTION

The method of fluid-solid mass transfer of this invention utilizes a tapered bed apparatus in which the porous medium is stratified such that the large particles are placed at the fluid inflow end, and porous particles of increasingly smaller size extend there from toward the outflow end. The angle of taper of this apparatus is such that during the exhaustion cycle of the mass transfer operation, the fluid flow is characterized by uniformly decreasing velocity from the inflow end to the outflow end resulting in increased mass transfer rate and reduced pressure drop.

The present invention provides a tapered apparatus for mass transfer that by virtue of its configuration promotes longer exhaustion cycle operation and shorter regeneration step, thereby increasing process efficiency. The present invention also provides a stratified tapered or reverse stratified tapered contacting method for fluid-solid mass transfer operations wherein the fluid velocity decreases in the direction of fluid flow, and the solid particles contacting the fluid are chosen to have decreasing size in the direction of flow.

This invention can be utilized to provide improved process efficiency in fluid-solid mass transfer operation with fluids containing no particulate material or with fluids containing appreciable amounts of particulate material. In fluid-solid mass transfer operations wherein the fluid contains particulate materials, a backwashing operation or several backwashing operations may be included during the exhaustion step of the cycle.

DESCRIPTION OF THE DRAWING

The method of this invention and preferred embodiments are illustrated in the accompanying drawings. Wherein.

DETAILED DESCRIPTION

Figure 1:
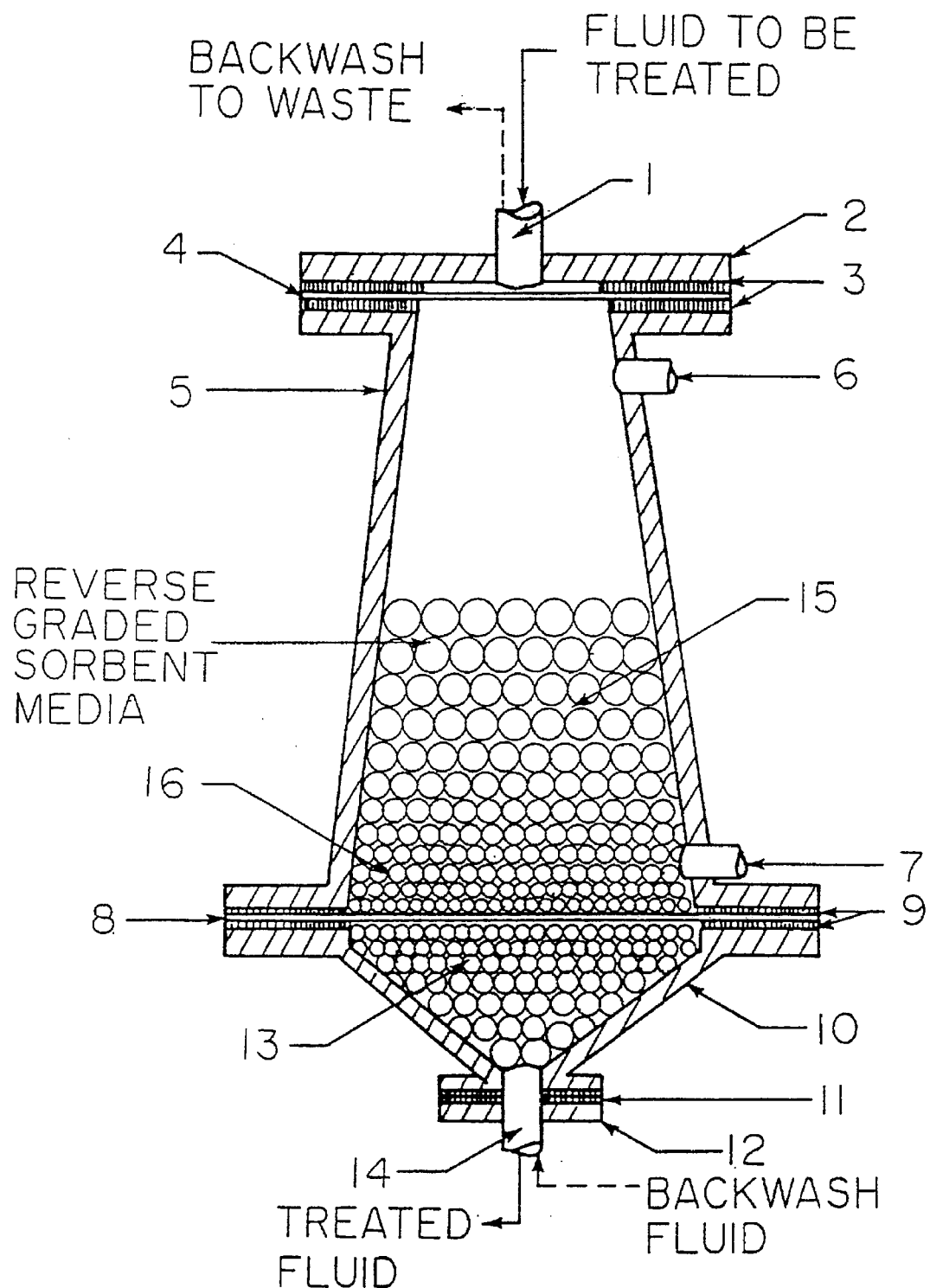
FIG. 1 is a side elevational view of a reverse stratified tapered adsorber, constructed in accordance with a first preferred embodiment of the present invention.

A reverse stratified tapered adsorption apparatus constructed in accordance with a preferred embodiment of the present invention is shown in FIG. 1.

The apparatus includes an upper casing 2 an intermediate casing 5, and a lower casing 10. The upper casing 2 provides enclosure at the top for the vessel provided by the casing 5. Casings 2 and 5 are separated by intermediate gaskets 3 and perforated screen 4. The gaskets 3 sandwich the perforated screen 4, and provide a tight seal between casings 2 and 5. Integral with casing 2 is structure 1 that can be used for admitting fluid into the vessel. The casing 5 contains structure 6 disposed adjacent at the upper end, and structure 7 disposed adjacent at the lower end. The peripheral wall of casing 5 extends from the upper casing 2 to the lower casing 10. Casing 5 is separated from the lower casing 10 by gaskets 9 and a perforated screen 8 sandwiched between the gaskets. The peripheral wall of casing 5 provides a chamber for fluid-solid mass transfer operations. The cross-sectional area of the chamber increases from the top adjacent to casing 2 to the bottom adjacent to casing 10. The lower casing 10 encompasses a distributor structure that in the preferred embodiment decreases in cross-sectional area, and connects to a fluid outlet structure 14. Casing 12 and gaskets 11 are provided to enclose and seal the bottom portion of the distributor.

In the preferred embodiment, the cross-sectional area of the chamber formed by casing 5 increases continuously from the top section adjacent to inlet 1 to the bottom section adjacent to the distributor 10. The shape of the chamber may be pyramidal, frustoconical or other forms with the cross-sectional area increasing in the direction of flow. The distributor formed by casing 10 may be of inverted pyramidal or inverted frustoconical shape in the preferred embodiment. A cylindrical distributor chamber may also be used.

The upper casing 2, the chamber casing 5 and the distributor casing 10 may be constructed of any material typically used for the construction of fluid-solid mass transfer operations. These include materials such as steel, stainless steel or other alloys, plastics, and concrete. The type of material used will depend on the extreme temperature and pressure conditions anticipated, and the corrosive nature of the fluid to be treated.

The chamber provided by casing 5 is partially filled with porous granules ranging in diameter from one micron to 3,000 microns depending on the nature of the application. For gas and liquid phase adsorption at pressures ranging from atmospheric to about five times atmospheric pressure, porous granule sizes ranging from 300 to 3000 microns may be used. For high pressure adsorption and chromatographic separations, particle diameters may range from 1 to 300 microns. Special applications can conceivably require larger or smaller diameters.

Two or more different porous adsorbent solids such as activated carbons, alumina, zeolite pellets, etc. may be used in the same chamber. Each of the different porous solid sections in this case will be reverse stratified with the larger particles more adjacent to the inlet of the chamber and the coarser particles closer to the fluid outlet. Two or more different ion-exchange resins with differing functionalities may be used, with each section being reverse stratified in the direction of fluid flow.

The distributor section of the bed encompassed by casing 10 contain inert nonporous particles such as, for example, sand, glass beads, glass marbles, plastic media, ballotini spheres, etc. In the preferred embodiment, the inert particle sizes are graded and stratified in the distributor, with smaller particles more adjacent to the perforated screen 8 and the larger particles more adjacent to the outlet structure 14.

For carrying out a mass transfer operation in the reverse stratified tapered adsorber shown in FIG. 1, a pressure gradient is applied across the bed from the inlet structure 1 to the outlet structure 12. As the fluid flows through the bed of porous media, mass transfer occurs from the fluid phase to the solid phase, and material will be selectively removed from the bulk fluid. In the case of adsorption from liquid phase, dissolved solute molecules will move from the bulk liquid onto the solid surface and concentrate within the solid phase. In gas adsorption, specific gas molecules will preferentially migrate and concentrate on the solid adsorbent particles. In ion-exchange operations, there will be an exchange of ions between the fluid phase and the solid phase.

In the present invention, the overall mass transfer rate is influenced by the velocity distribution and the adsorbent size distribution in the adsorber. The concentration gradient for mass transfer is highest at the inlet end, and here the fluid is contacted with the larger sized porous particles. The mass transfer rate is increased due to the higher mass transfer coefficient at the higher velocities. As the fluid flows down, material is progressively transferred from the fluid phase to the solid phase, and the concentration gradient for mass transfer decreases throughout the bed from the inlet to the outlet. The concentration gradient is lowest adjacent to the outlet end. Mass transfer is enhanced at the outlet end due to the higher mass transfer coefficient for the smaller diameter adsorbent particles.

In the case of fluids with particulates, the present invention also enhances the removal of particulate matter as noted in prior art on tapered bed filtration (U.S. Pat. No. 5,292,436, Incorporated by reference herein). In conventional fixed-bed adsorbers, the presence of particulates will promote rapid clogging at the influent section of the adsorber, and continued operation will be hampered due to excessive pressure drop across the bed and consequent cessation of flow. Thus, the bed will need to be backwashed to remove the accumulated particles. In adsorption operations, periodic backwashing will result in the loss of overall efficiency due to the desorption of accumulated material from the solid phase. Thus, the present invention will produce additional increase in efficiency by minimizing the loss of material by desorption due to less frequent backwashing requirements.

Backwashing is not required during the adsorption cycle if the fluid contains no particulates. In such cases, the bed may be operated in the adsorption mode until the bed is completely saturated. However, if the fluid contains particulates, the bed must be fluidized by allowing the fluid to flow upflow through the inlet structure 14. The adsorbent bed will remain stratified during backwash, and the behavior of the bed operation will be as indicated in the prior art on tapered bed filtration (U.S. Pat. No. 5,292,436, Incorporated by reference herein).

Figure 2:
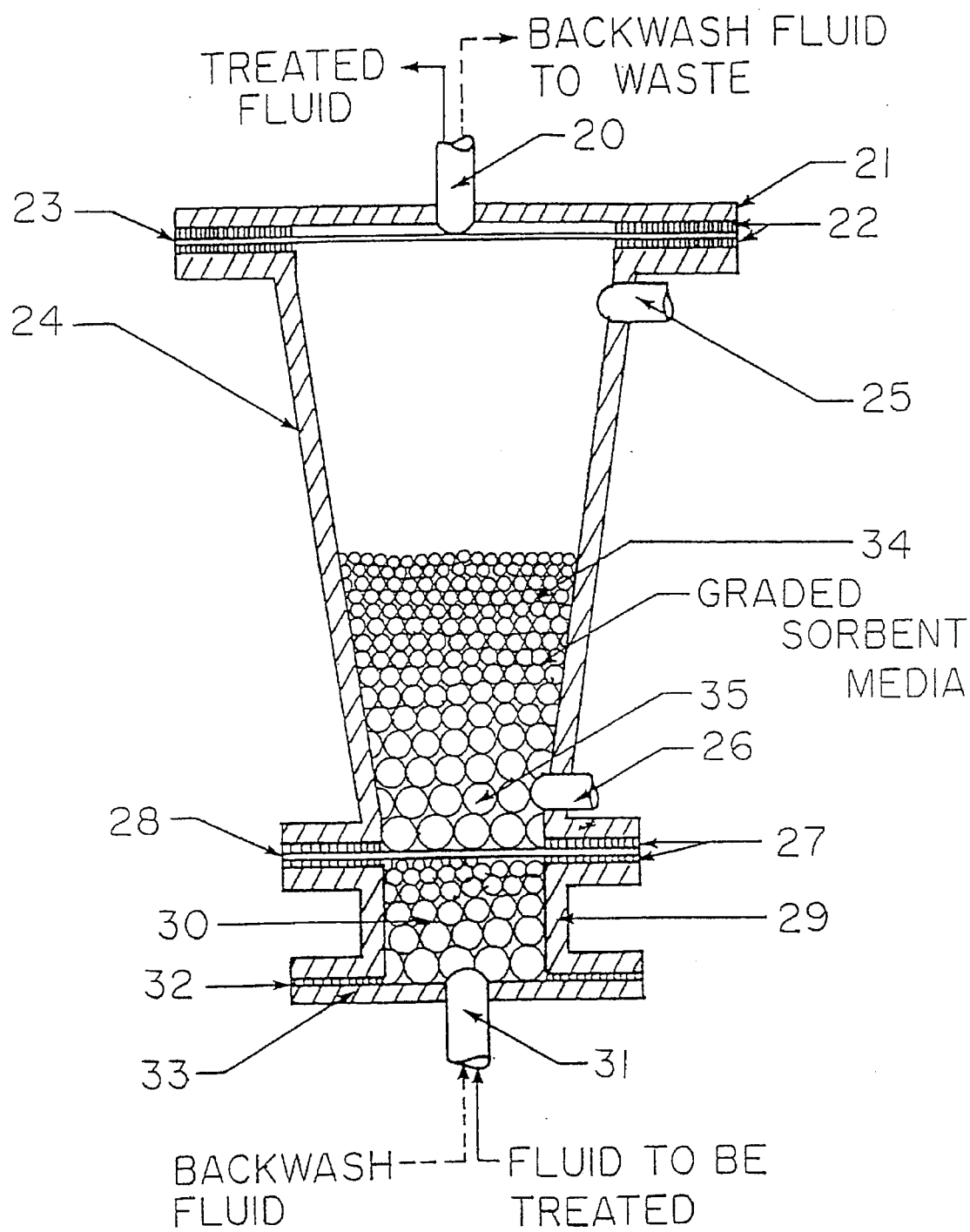
FIG. 2 is a side elevational view of the stratified tapered adsorber, constructed in accordance with a second preferred embodiment of the present invention.

A stratified tapered adsorber for fluid-solid mass transfer operations, constructed in accordance with a second preferred embodiment of the present invention is illustrated in FIG. 2. The apparatus has a chamber for fluid-solid mass transfer formed by the casing 24, enclosed by an upper casing 21, and a lower distributor casing 29. The gaskets 22 adjacent to the upper casing provide seal between casings 21 and 24. A perforated screen 23 is sandwiched between the gaskets 22 to prevent movement of adsorbent particles out of the bed during normal adsorption or backwash operations. Casing 21 has a structure 20 to allow fluid flow into or out of the vessel.

The peripheral wall formed by casing 24 provides the chamber for fluid-solid mass transfer operations. When viewed from the top the chamber cross-sectional area decreases from adjacent to casing 21 to the bottom adjacent to gasket 27 and casing 29. The adsorption chamber includes structure 25 adjacent to gaskets 22 and casing 21, and structure 26 adjacent to gaskets 27 and the distributor casing 29. Structures 25 and 26 allow the loading of adsorbent particles into the adsorption chamber and removal therefrom.

The adsorption chamber formed by casing 24 is separated from the distributor casing 29 by a perforated screen 28 sandwiched between gaskets 27. The peripheral wall for the distributor casing 29, forms in the preferred embodiment, a cylindrical chamber. The distribution chamber is sealed at the bottom using a lower casing 33 and gasket 32 to provide the seal between the casings. Integral to the lower casing 33 is structure 31 to allow for fluid flow into and out of the apparatus.

The adsorption chamber formed by casing 24 is partly filled with adsorbent particles or ion-exchange resins, and the bed is stratified with the larger particles more adjacent to the perforated screen 27 and the smaller particles more adjacent to the perforated screen 23. In the preferred embodiment for fluid-solid mass transfer operations with fluids containing particulates, a free space is provided between the adsorbent particles and the upper perforated screen 23. A free space is not required if the fluid contains no particulates. The adsorbent bed may also be comprised of more than one type of adsorbent material. In this case, particle stratification is provided for within each adsorbent section. The distributor section formed by casing 29 is filled with inert nonporous particles in the preferred embodiment. The particles may be stratified such that the larger particles are more adjacent to inlet 31, and the smaller particles are more adjacent to the perforated screen 28.

Mass transfer operations are accomplished in the embodiment illustrated in FIG. 2, by passing the fluid upward through the inlet structure 31 and removing the treated fluid through the outlet structure 20. The fluid velocity decreases from the inlet to the outlet. Mass transfer is enhanced as the fluid with the high concentration gradient at the inlet end contacts larger particles at relatively higher velocities when compared to the upper portion of the bed. As the concentration gradient and velocities decrease in the direction of flow, the particle diameters are also decreased to enhance mass transfer.

If the fluid contains no particulates, the bed need not be backwashed between adsorption and regeneration cycles. If the fluid contains particulates, the adsorbent bed is backwashed periodically during the adsorption cycle by passing fluid upward through the inlet 31. The backwash fluid is collected from the outlet 20. The bed will remain stratified during backwash, and the behavior of the bed during backwash will be as described in prior art on tapered bed filtration (U.S. Pat. No. 5,292,436, Incorporated by reference herein).

The method of invention is further illustrated by the following comparative examples.

COMPARATIVE TESTS

Comparative adsorption studies were conducted in conventional fixed-bed adsorber with a constant circular cross-section of diameter 2 inches, and a reverse stratified bed adsorber constructed according to the first preferred embodiment of the present invention. The cylindrical column was 24 inches deep, and was provided with sampling taps at depths corresponding to bed volumes of 16%, 44%, 72%, and 100%.

One reverse stratified tapered adsorber was constructed out of plexiglas with a 0.866 inch by 0.827 inch rectangular cross-section at the top and 1.89 inch by 1.81 inch rectangular cross-section at the bottom. The column was 24 inches deep, and was provided with sampling taps at depths corresponding to adsorbent bed volumes of 6.6%, 20%, 36%, 55%, 77%, and 100%.

The adsorbent utilized was granular activated carbon (CECARBON GAC 40) supplied by Atochem, Inc., Tulsa, Okla. A total of 224 grams of the adsorbent was used in each of the beds. Eight strata of adsorbent particles of differing sieve size fractions were used. The geometric mean diameters of the size fractions used in micrometers are: 1539, 1295, 1091, 917, 772, 647, 543, and 458. In the conventional cylindrical fixed-bed adsorber, the adsorbent particles were placed in ascending order of diameter from top to bottom. This is the natural configuration of such beds after backwashing. In the reverse stratified tapered adsorber described in the preferred embodiment of FIG. 1., the adsorbent particles were placed in descending order of diameter from the top to the bottom. Fluid flow in both columns was downflow from the top to the bottom at the rate of 325 ml/min.

EXAMPLE 1

Figure 3:
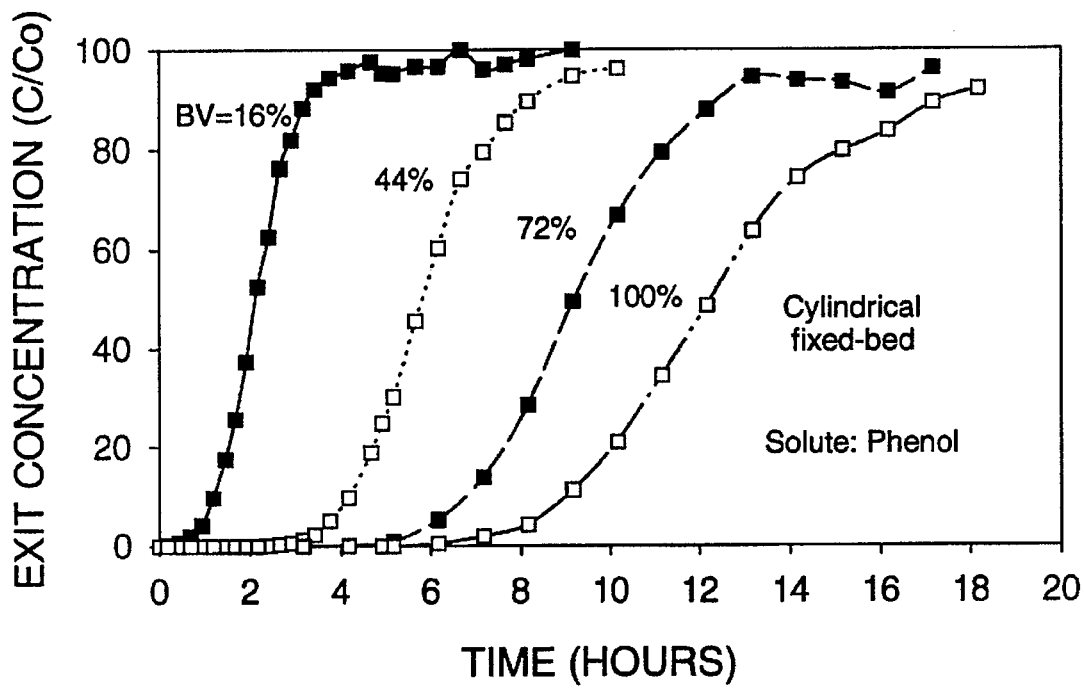
FIG. 3 is a diagram showing fluid phase concentration curves for a conventional cylindrical fixed-bed adsorber as a function of adsorbent bed volume, illustrating the spreading of the solute front within the adsorbent bed, in the removal &phenol from an aqueous solution using activated carbon adsorbent.
Figure 4:
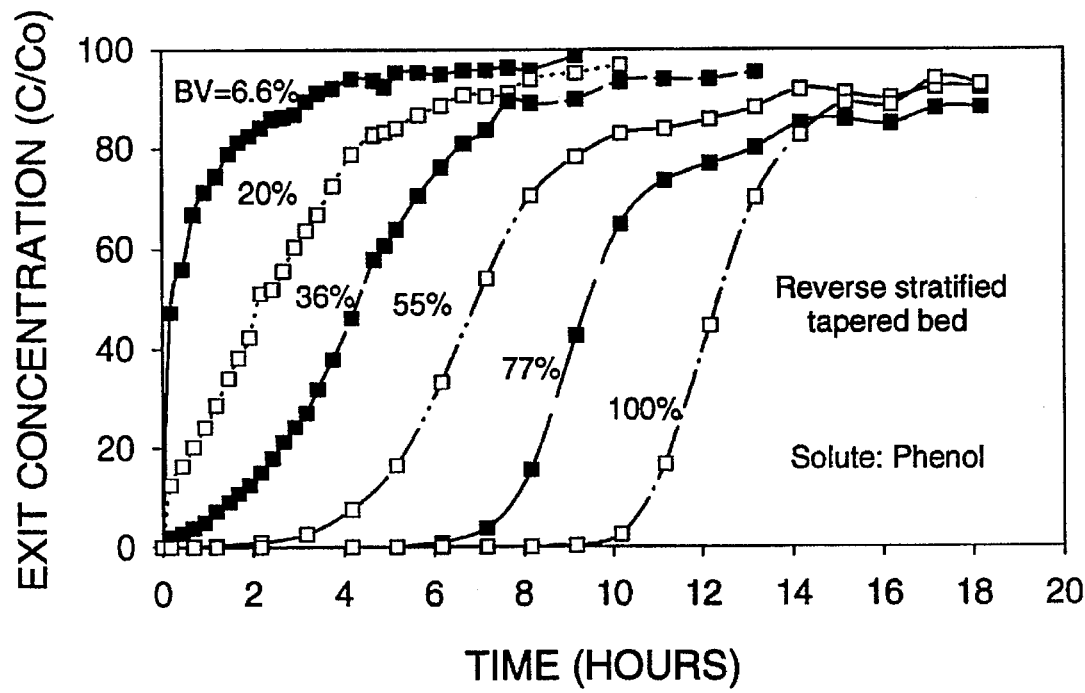
FIG. 4 is a diagram showing fluid phase concentration curves for a reverse stratified tapered adsorber as a function of adsorbent bed volume, illustrating the sharpening of the solute front within the reverse stratified tapered bed, in the removal of phenol from an aqueous solution using activated carbon adsorbent.
Figure 5:
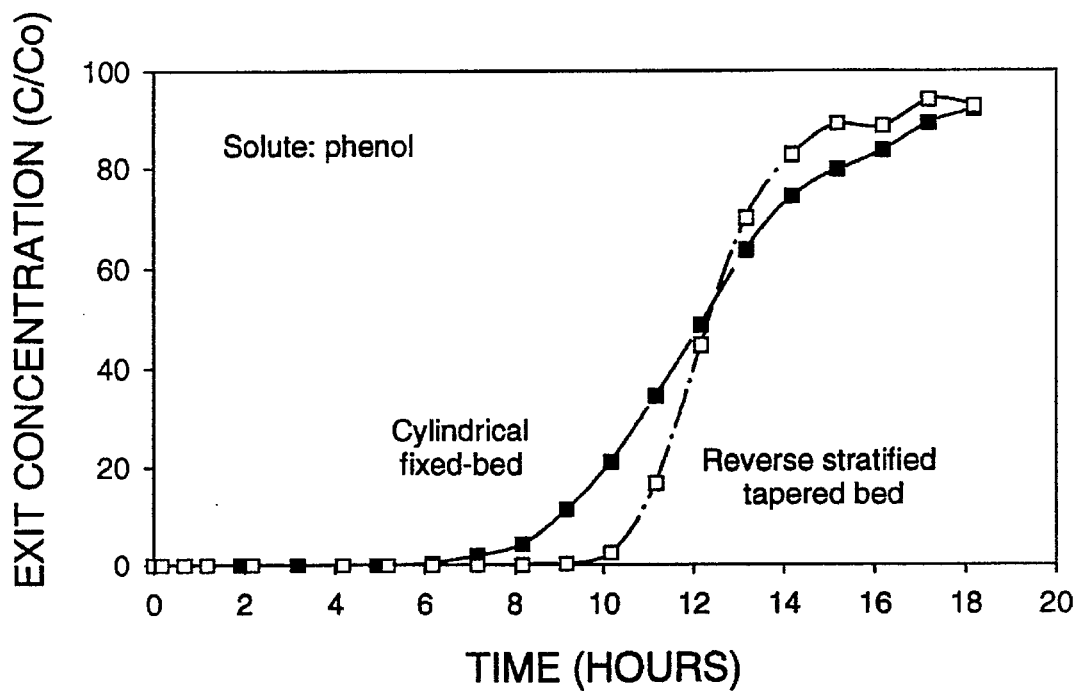
FIG. 5 is a diagram illustrating the difference in the exit concentration curves between a conventional cylindrical fixed-bed adsorber and a reverse stratified tapered adsorber for the case illustrated in FIG. 3 and FIG. 4.

An aqueous solution of phenol at an inlet concentration of 150 mg/l was used in these experiments. FIG. 3 shows the breakthrough curves obtained from the conventional fixed-bed adsorber at various depths. FIG. 4 shows the breakthrough curves under identical conditions from the reverse stratified tapered adsorber as described in the preferred embodiment of FIG. 1. A comparison of FIG. 3 and FIG. 4 indicates that the solute front becomes more spread out or diffuse as it moves through the conventional cylindrical fixed-bed adsorber. On the other hand, in the reverse stratified adsorber constructed in accordance with the embodiment in FIG. 1, the combination of a varying velocity and varying particle size results in a sharpening of the adsorption wave front as it travels through the column. FIG. 5 shows a comparison of the concentration curves at the exit of the two columns. The reverse stratified adsorber provides for an increase of 61% more operating time at breakthrough compared to the conventional fixed-bed adsorber.

EXAMPLE 2

Figure 6:
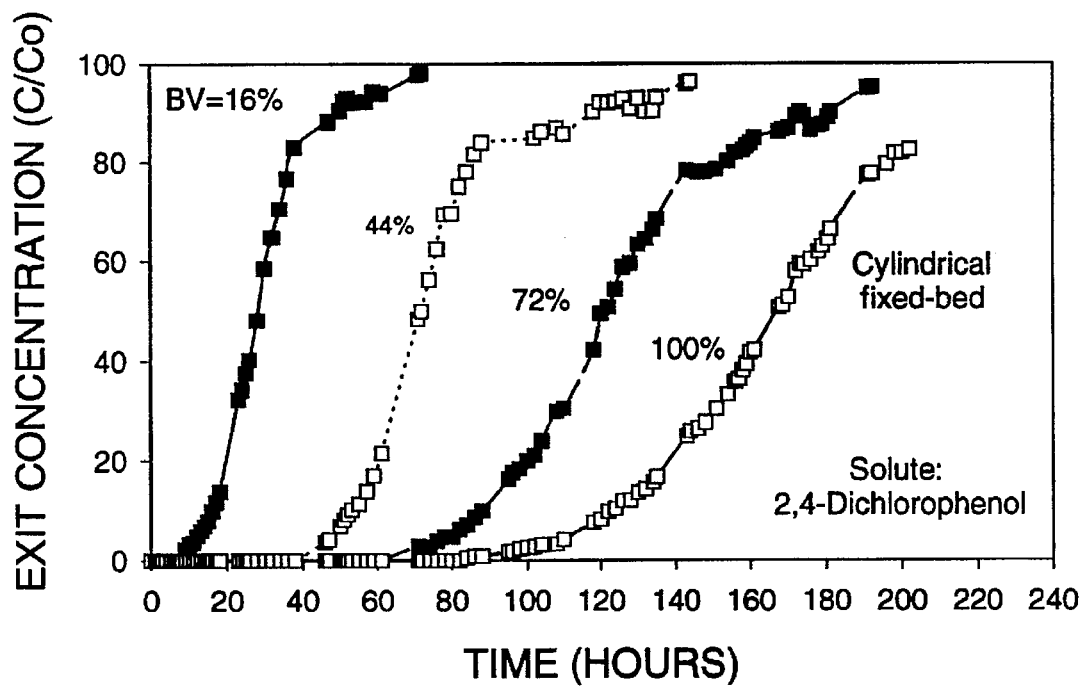
FIG. 6 is a diagram showing fluid phase concentration curves for a conventional cylindrical fixed-bed adsorber as a function of adsorbent bed volume, illustrating the spreading of the solute front within the adsorbent bed, in the removal of 2,4-dichlorophenol from an aqueous solution using activated carbon adsorbent.
Figure 7:
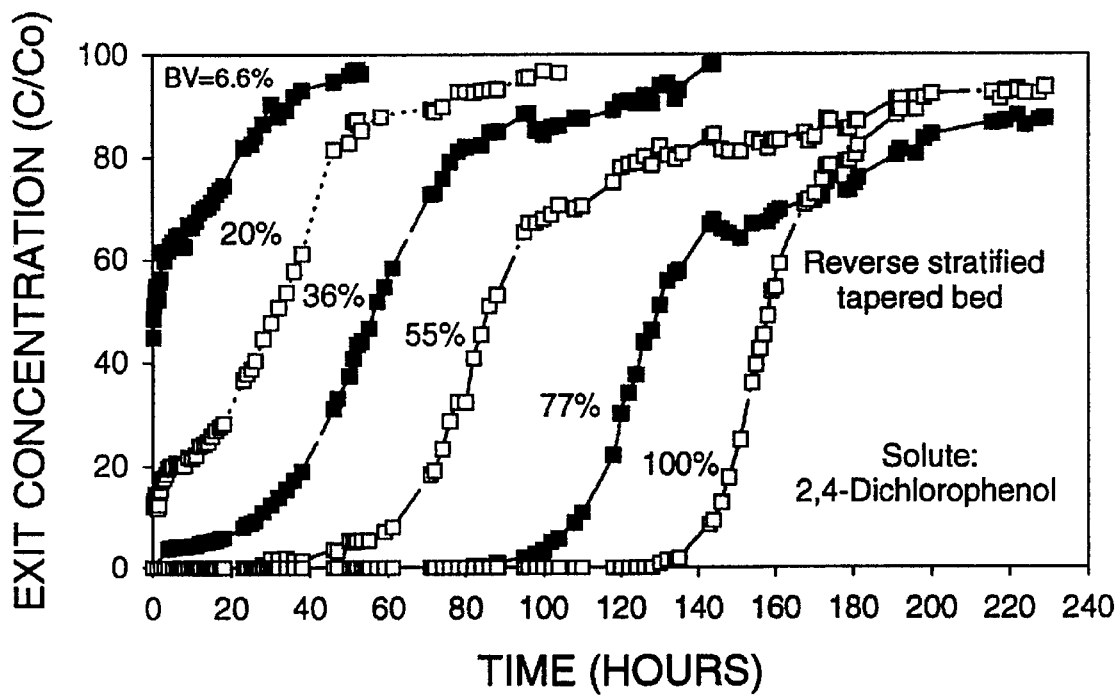
FIG. 7 is a diagram showing fluid phase concentration curves for a reverse stratified tapered adsorber as a function of adsorbent bed volume, illustrating the sharpening of the solute front within the reverse stratified tapered bed, in the removal of 2,4-dichlorophenol from an aqueous solution using activated carbon adsorbent.
Figure 8:
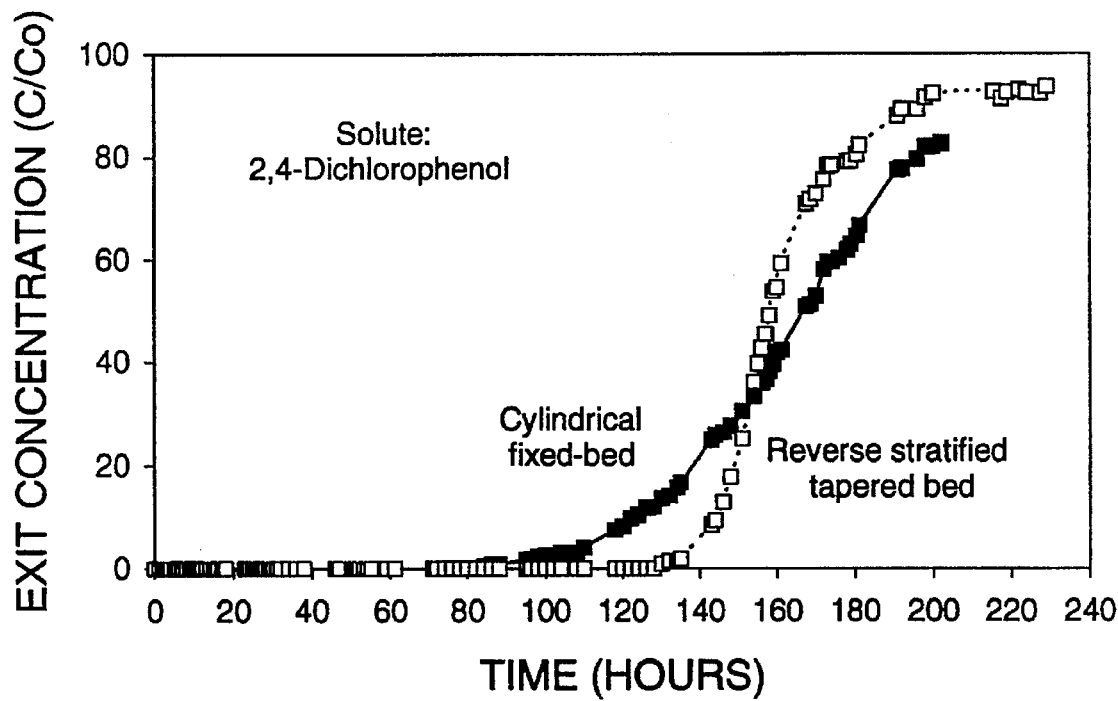
FIG. 8 is a diagram illustrating the difference in the exit concentration curves between a conventional cylindrical fixed-bed adsorber and a reverse stratified tapered adsorber for the case illustrated in FIG. 6 and FIG. 7.

An aqueous solution of 2,4-dichlorophenol at an inlet concentration of 30 mg/l was used in this set of experiments. The columns were operated for an extended period of time of upto 230 hours. FIG. 6 shows the spreading of the solute front as it propagates through the conventional fixed-bed adsorber. FIG. 7 shows the self-sharpening nature of the solute front in the reverse stratified tapered adsorber. Comparison of the two exit breakthrough curves shown in FIG. 8 indicate that the sharpening of the breakthrough front provides for a relative increase in breakthrough time of 55% for the reverse stratified tapered adsorber over the conventional fixed-bed adsorber. The increase in breakthrough time directly translates into cost savings, since 55% more fluid can be processed using the same quantity of adsorbent before it needs to be regenerated or replaced.

I claim:

1. A mass transfer method for transferring at least one dissolved component of a fluid phase into porous granules having external and internal surfaces which are active for said transference of said component, said method comprising the steps of:

providing a mass transfer adsorption apparatus having a fluid phase inlet and a spaced fluid phase outlet, a bed of porous granules disposed between said inlet and said outlet for passage of said fluid through said bed of porous granules along a direction of flow from said inlet to said outlet, said apparatus further having a first casing and a lower second casing, the first casing being coupled to said lower casing, the inlet being connected to the distal end of said first casing, and the outlet being connected to the distal end of the said lower casing, said apparatus further comprising a screen disposed between said first casing and said lower casing, a first sealing means disposed between said screen and said first casing, and a second sealing means disposed between said screen and said lower second casing, said first casing having an elongated sidewall between said inlet and said screen, said sidewall defining an internal chamber housing said bed of porous granules, said chamber having a longitudinal axis and a transverse cross-sectional area, said transverse cross-sectional area increasing from said inlet to said screen, said bed of porous granules being stratified within said chamber, said bed of porous granules having relatively larger and smaller diameters with said larger diameter granules being disposed closer to said inlet than said smaller diameter granules, said smaller diameter granules being disposed closer to said screen than said larger diameter granules, said lower second casing containing a stratified bed of inert nonporous particles having relatively larger and smaller diameters with said larger diameter particles being disposed closer to said outlet than said smaller diameter particles, said smaller diameter particles being disposed closer to said screen than said larger diameter particles, wherein said method further comprises passing said fluid phase into said inlet, through said beds, and out said outlet, wherein, by said passing of said fluid phase through said beds, the velocity of the fluid phase from said inlet to said outlet is decreased and mass transfer of said component from said fluid phase into said porous granules is enhanced.

2. The method of claim 1, including the step of causing said fluid phase to pass in a downward direction through said apparatus.

3. The method of claim 1, wherein said granules have a single common density.

4. The method of claim 1, wherein said granules are selected from the group consisting of activated carbons, activated alumina, silica gels, zeolites, zirconia, carbon molecular sieves, and polymeric resins.

5. The method of claim 1, including the step of passing said fluid phase through said apparatus under cyclic operating conditions selected from the group consisting of pressure swing adsorption, temperature swing adsorption, vacuum swing adsorption, and DH parametric pumping and combinations thereof.

6. The method of claim 1, including the step of passing said fluid phase through said apparatus under high pressure conditions.

\* \* \* \* \*